Oct. 27, 1931.   McMASTER S. BLACKBURN   1,828,954
GRAVITY CALCULATOR
Filed May 21, 1930
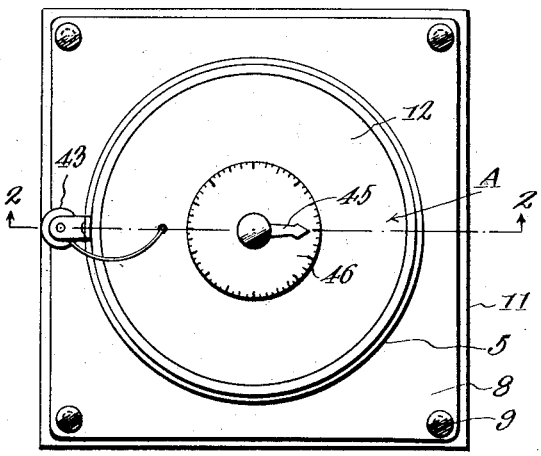
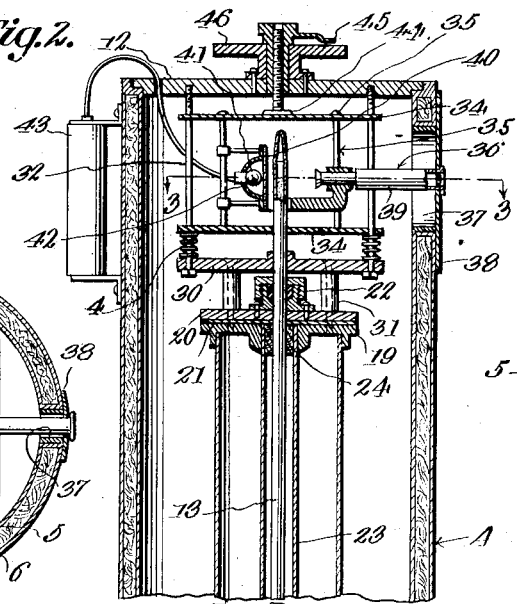
INVENTOR.
McMASTER S. BLACKBURN
ATTORNEY Patented Oct. 27, 1931

1,828,954

UNITED STATES PATENT OFFICE

McMASTER SYLVESTER BLACKBURN, OF SAN ANTONIO, TEXAS, ASSIGNOR TO GEOPHYSICAL PETROLEUM CORPORATION, OF SAN ANTONIO, TEXAS, A CORPORATION OF TEXAS

GRAVITY CALCULATOR

Application filed May 21, 1930. Serial No. 454,460.

This invention relates to measuring devices and more particularly to a precision instrument for determining minute variations in the force of gravity at different points about the surface of the earth.

It is known that the value of gravity is affected by undulations, dips and other irregularities in those underlying rock strata relatively close to the surface of the earth and that the nature and extent of such irregularities may be learned by accurate observations at spaced points on the ground and subsequent comparison of such observations.

However, the anomalies in gravity due to arching, folding and other irregularities in the subsurface structure relatively close to the surface of the earth are of such a minute order of magnitude that the same may be detected only by the employment of an agency responsive to such slight variations in gravity and which at the same time is not affected by such disturbing influences as temperature and atmospheric changes. The herein disclosed invention contemplates a relatively simple and easily handled means by which observations of the type suggested may be made for comparison and definite determination of anomalies in gravity to the end that subsurface structures likely to bear oil or other minerals may be located.

Since, the value of gravity is determined, in a measure, by undulations and other irregularities in the subsurface structure relatively close to the surface of the earth, it follows that the weight of a body such, for example, as a column of mercury, will be affected by such anomalies in gravity and the invention forming the subject of this application will be found to provide for ready detection and observation of the effect produced on the column of mercury or the like by the varying force of gravity in a given area on the surface of the earth.

More specifically, the invention aims to provide a gravity calculator which is sufficiently compact, rugged and easy to operate to adapt the same to expeditious use in the field.

Other objects and advantages will be apparent during the course of the following description.

In the accompanying drawings forming a part of this application and in which like numerals are employed to designate like parts throughout the same, Figure 1 is a top plan view of my improved instrument, Figure 2 is a vertical longitudinal section through the same taken on the line 2—2 of Figure 1 looking in the direction of the arrows, Figure 3 is a horizontal section taken on the line 3—3 of Figure 2 illustrating the mounting of the microscope on the sliding carriage, Figure 4 is a detail fragmentary perspective view illustrating the slide door for the casing carried by the sight tube of the microscope.

Figure 5 is a detail elevation illustrating the upper portion of the barometer tube and an associated ground glass.

Referring to the drawings in detail, wherein similar reference characters designate corresponding parts throughout the several views, the letter A generally indicates my improved instrument which comprises a protecting casing 5, which can be of circular shape in cross section. This casing 5 is provided with a jacket 6 and the space between the walls of the casing and jacket can be heat insulated in any preferred way, such as by the use of ground cork 7. The lower closed end of the casing 5 can be received within a suitable bed plate 8, the corners of which can carry adjustable leveling screws 9, the lower ends of which are received in pockets 10 formed in the upper face of a supporting base 11. It is obvious that by adjusting the screws the protecting casing can be made absolutely level.

The upper end of the protecting casing is closed by an insulated cover 12, constructed to make a snug fit with the upper end of said casing. This casing receives at its axial center a mercury tube 13 which can be in the nature of a siphon barometer. The upper end of the tube 13 is closed and above the column of mercury the tube is evacuated.

The upper end of the short leg of the siphon tube preferably terminates in a well 14 closed by a cork stopper 15 which stopper carries a petite tube 16.

The mercury tube 13 is received within a suitable air chamber 17, which chamber can be in the nature of a metal tube with a closed bottom 18. The upper end of the tube 17 has rigidly secured thereto a closure plate 19 on which fits a similar plate 20, a gasket 21 being interposed between the said plates. The upper end of the mercury tube 13 protrudes through axial openings in said plates 19 and 20 and a stuffing box or gland 22 is carried by the plate 20 and engages said tube. By the provision of the air chamber 17, I am enabled to protect the mercury tube from atmospheric changes and in order to further protect the tube the same can be surrounded by a small metal tube 23, the upper and lower ends of which are closed by stoppers 24 and 25 respectively.

The upper end of the tube 23 is connected with the lower plate 19, while the lower end of the tube is connected to the top plate 26 of a frame 27. The frame 27 also includes a lower plate 28, on which the bent portion of the mercury tube rests, a suitable pad being interposed between the mercury tube and said lower frame plate. The upper and lower frame plates 26 and 28 are connected by suitable bolts or rods 29.

In accordance with my invention, I provide a supporting plate 30 arranged directly above the air chamber 17 and connected therewith by short stud bolts 31. This supporting plate 30 is suspended from the top 12 of the casing 5 by means of depending bolts or guide rods 32, these bolts or guide rods 32 being preferably four in number. The mercury tube projects through the supporting plate as shown, and the guide rods 32 slidably support a carriage 33 which may comprise upper and lower plates 34 connected by spacing rods 35.

The carriage 33 has rigidly connected therewith for sliding movement a microscope 36, the sight tube of which protrudes through a slot 37 in the wall of the casing 5. Connected with the sight tube of the microscope is a door 38 for covering said slot and if preferred the door can carry a protecting tube 39 for further preventing the entrance of air into the protecting house. The base of the microscope is disposed at one side of the tube of mercury, while the sight tube of the microscope is disposed on the other side and the base may comprise a sheet of ground glass 40. The ground glass 40 may have an indicating line marked thereon and the rear of the glass is suitably illuminated, such as by the use of an electric light bulb 41 carried by a reflector 42 placed against the back of the said ground glass plate. The source of energy for the electric light bulb may comprise an electric battery 43 carried by the main casing 5.

The carriage 33 is normally urged toward a raised position by expansion springs 4 mounted on the guide rods 32 and interposed between the lowermost plate 34 of the carriage and the supporting plate 30. Mounted against the upper plate 34 of the carriage is the foot 44 of a micrometer gauge which is connected with the top wall or cover 12 of the main casing 5. Connected with the micrometer screw and foot is a vernier arm 45 rotatable over a dial 46 connected with the body of the micrometer. This dial is graduated into 360 degrees and the micrometer screw has forty threads to the inch. Therefore, 360 degrees on the circle equals one one fortieth of an inch, or twenty five one thousandths of an inch.

In use of my improved device, the casing 5 is filled with cracked ice so that a substantially constant temperature prevails inside the casing and around the mercury tube, irrespective of outside temperature conditions. Thus, the mercury tube is not subjected either to changes in atmospheric conditions or temperature.

It is believed to be apparent that when the instrument is moved from place to place over the surface of the earth, anomalies in gravity, however minute, will be accurately reflected through a change in the height of the column of mercury in the hole 13.

The observer by looking through the microscope 36 may adjust the hair line on the glass 40 to the height of the column of mercury, this being possible by turning the micrometer screw and the pointer hand 45 thereof. When this has been done, the desired reading may be taken from the dial 46 and subsequent comparison of the instrument readings will indicate the extent of anomalies in gravity in a particular field.

Commercial oil and gas deposits generally occur in the higher parts of folds or wrinkles of the earth's surface known as anticlines, domes and monoclines. All commercial deposits with one exception, that at Thrall, Texas, so far have occurred in sedimentary or water-laid deposits such as sands, sandstones, conglomerates, shales, and limestones and even though undulations or irregularities in these strata have a minute effect on the force of gravity, the herein disclosed instrument has been found to reflect with accuracy such variation with the result that the location and extent of subsurface structures likely to bear petroleum may be determined with an appreciable degree of accuracy.

The instrument has been found to be capable of reflecting, with easy visibility, a change in gravity as small as one part in two millionths. Checks and rechecks made in particular areas have been found to harmonize with the checks made by more cumbersome instruments and means of recognized value.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. A device for measuring anomalies in gravity comprising a liquid column, means for protecting said column against temperature and atmosphere changes, a carriage slidable relative to the column having an indicator for alignment with the top of the liquid column, and means including a precision measuring instrument for adjusting said carriage.

2. A device for measuring anomalies in gravity comprising a liquid column, means for protecting said column against temperature and atmospheric changes, a carriage slidable relative to the column, having an indicator for alignment with the top of the liquid column, means including a precision measuring instrument for adjusting said carriage, and a microscope slidable with the carriage for facilitating the alignment of the indicator with the top of the liquid column.

3. A device for measuring anomalies in gravity comprising a liquid column, means for protecting said column against temperature and atmospheric changes, a carriage slidable relative to the column, means normally urging the carriage in one direction, an indicator slidable with the carriage for alignment with the top of the liquid column, means including a measuring precision instrument acting on said carriage and against said means normally urging the carriage in one direction for aligning the indicator with the top of the liquid column.

4. A device for measuring anomalies in gravity comprising a liquid column, means for protecting said column against temperature and atmospheric changes, a carriage slidable relative to the column, means normally urging the carriage in one direction, an indicator slidable with the carriage for alignment with the top of the liquid column, means including a measuring precision instrument acting on said carriage and against said means normally urging the carriage in one direction for aligning the indicator with the top of the liquid column, a microscope for facilitating the aligning of the indicator with the top of the liquid column including a sight tube arranged on one side of the column and a ground glass base on the other side of the column, the indicator being carried by said ground glass base.

5. A device for measuring anomalies in gravity comprising a liquid column, means for protecting said column against temperature and atmospheric changes, a carriage slidable relative to the column, means normally urging the carriage in one direction, an indicator slidable with the carriage for alignment with the top of the liquid column, means including a measuring precision instrument acting on said carriage and against said means normally urging the carriage in one direction for aligning the indicator with the top of the liquid column, a microscope for facilitating the aligning of the indicator with the top of the liquid column including a sight tube arranged on one side of the column and a ground glass base on the other side of the column, the indicator being carried by said ground glass base, and means for illuminating said ground glass base.

6. A device for measuring anomalies in gravity comprising a liquid column, an ice pack casing for receiving the liquid column, an indicator slidable in the casing relative to the liquid column, and means operable exteriorly of the casing including a precision measuring instrument for adjusting the indicator relative to the top of the liquid column.

7. A device for measuring anomalies in gravity comprising a barometer siphon tube having a liquid therein, the upper end of the long leg of the tube being closed and air exhausted above the liquid therein, the short leg of the tube being open, an air tight casing receiving the tube with the upper end of the long leg protruding therefrom, an ice pack casing, the barometer tube and the air tight casing being suspended in the ice pack casing, an indicator slidable in the ice pack casing relative to the tube, and means including a precision measuring instrument for adjusting the indicator relative to the height of the liquid in the tube.

8. A device for measuring anomalies in gravity comprising a barometer siphon tube having a liquid therein, the upper end of the long leg of the tube being closed and air exhausted above the liquid therein, the short leg of the tube being open, an air tight casing receiving the tube with the upper end of the long leg protruding therefrom, an ice pack casing, the barometer tube and the air tight casing being suspended in the ice pack casing, a carriage slidably mounted within the ice pack casing and receiving the upper end of the barometer tube, spring means normally urging the carriage toward the upper end of the ice pack casing, a microscope secured to the carriage and slidable therewith embodying a sight tube and a ground glass base, an indicator line on the ground glass base, the ground glass base being arranged on one side of the barometer tube and the sight tube on the other side, a micrometer carried by the upper end of the casing having the screw thereof engaging the carriage for adjusting the same against the tension of said spring means, the ice pack casing having a slot therein for receiving the outer end of the microscope sight tube, and a slide door carried by the outer end of the sight tube covering said slot.

9. A device for measuring anomalies in gravity comprising a barometer siphon tube having a liquid therein, the upper end of the long leg of the tube being closed and air exhausted above the liquid therein, the short leg of the tube being open, an air tight casing receiving the tube with the upper end of the long leg protruding therefrom, an ice pack casing, the barometer tube and the air tight casing being suspended in the ice pack casing, a carriage slidably mounted within the ice pack casing and receiving the upper end of the barometer tube, spring means normally urging the carriage toward the upper end of the ice pack casing, a microscope secured to the carriage and slidable therewith embodying a sight tube and a ground glass base, an indicator line on the ground glass base, the ground glass base being arranged on one side of the barometer tube and the sight tube on the other side, a micrometer carried by the upper end of the casing having the screw thereof engaging the carriage for adjusting the same against the tension of said spring means, the ice pack casing having a slot therein for receiving the outer end of the microscope sight tube, a slide door carried by the outer end of the sight tube covering said slot, a reflector carried by the outer face of the ground glass base, an electric bulb carried by the reflector, and a source of electrical energy for the electric light bulb arranged exteriorly of the casing.

10. A device for measuring anomalies in gravity comprising an insulated ice pack casing having a removable cover, a supporting plate arranged below the cover, depending supporting bolts connecting the supporting plate with the cover in spaced relation thereto, an air tight casing arranged axially within the ice pack casing having a packed closure, means connecting the closure with the supporting plate, a siphon barometer arranged in the air tight casing having its long leg protruding through the closure and through the supporting plate, a packing gland carried by the closure surrounding the long leg of the barometer tube, the short leg of the barometer tube being open, a carriage slidable on the supporting bolts for the supporting plate, spring means interposed between the carriage and the supporting plate for normally urging the carriage in one direction, a micrometer carried by the cover of the ice pack casing having the screw thereof engaging the carriage for adjusting the same against the tension of said springs, a microscope secured to and movable with the carriage including a ground glass base arranged on one side of the long leg of the barometer and a sight tube arranged on the other side of said leg of the barometer, the sight tube extending through a slot in the wall of the ice pack casing, a slide cover carried by the sight tube and overlying said slot, and means for illuminating the ground glass base, a liquid in the barometer tube, the upper end of the long leg of the barometer tube being closed and air exhausted above the liquid.

11. A device for measuring anomalies in gravity comprising an insulated ice pack casing having a removable cover, a supporting plate arranged below the cover, depending supporting bolts connecting the supporting plate with the cover in spaced relation thereto, an air tight casing arranged axially within the ice pack casing having a packed closure, means connecting the closure with the supporting plate, a siphon barometer arranged in the air tight casing having a long leg protruding through the closure and through the supporting plate, a packing gland carried by the closure surrounding the long leg of the barometer tube, the short leg of the barometer tube being open, a carriage slidable on the supporting bolts for the supporting bolts for the supporting plate, spring means interposed between the carriage and the supporting plate for normally urging the carriage in one direction, a micrometer carried by the cover of the ice pack casing having a screw engaging the carriage for adjusting the same against the tension of said springs, a microscope secured to and movable with the carriage including a ground glass base arranged on one side of the long leg of the barometer and a sight tube arranged on the other side of said leg of the barometer, the sight tube extending through a slot in the wall of the ice pack casing, a slide cover carried by the sight tube and overlying said slot, means for illuminating the ground glass base, a liquid in the barometer tube, the upper end of the long leg of the barometer tube being closed and air exhausted above the liquid, a supporting tube housing a portion of the long leg of the barometer tube, means connecting the upper end of the tube to the closure of the air tight casing, and a supporting frame on which the barometer tube rests.

In testimony whereof I affix my signature.

McMASTER SYLVESTER BLACKBURN.